July 12, 1960

D. H. DENNIS 2,944,684

PNEUMATIC CONVEYOR

Filed Dec. 30, 1957

INVENTOR.
BY David H. Dennis

AGENT

United States Patent Office 2,944,684
Patented July 12, 1960

2,944,684
PNEUMATIC CONVEYOR

David H. Dennis, Short Hills, N.J., assignor to Specialties Development Corporation, Belleville, N.J., a corporation of New Jersey Filed Dec. 30, 1957, Ser. No. 706,082

6 Claims. (Cl. 214—1)

The present invention relates to conveyors, and, more particularly, to pneumatic conveyors of the type including an airfilm table having valved openings therein through which air is directed to move objects supported on the table.

Such pneumatic conveyors of previously known designs have not been entirely satisfactory with respect to both cost and performance. In what appears to be the most popular type, the airfilm table is provided with threaded holes, and valve assemblies including a threaded housing screwed into the holes. This housing has an inwardly extending flange at its upper end which is machined to provide a valve seat for a metal ball valve member positioned within the housing, and has an outwardly extending flange at its upper end which is in an enlarged upper portion of the holes. Another known conveyor construction utilizes an airfilm table which is machined about the holes to provide a valve seat which cooperates with a metal ball held against the seat by a spring attached to the underside of the table.

It is readily apparent that the machining and threading operations necessary in the construction of these conveyors are time consuming and consequently increase the initial cost of the conveyors. It will also be appreciated by those skilled in the art, that a metal valve member cooperating with a metallic valve seat will provide a good seal only if these parts are carefully dimensioned and that the slightest wear of the valve member or the seat may cause leakage, particularly if the wear is uneven.

A further disadvantage of such known conveyors is high maintenance cost. In the first mentioned type, the valves used are expensive to maintain because they have an excessive number of parts and/or are difficult to disassemble, and because the metal valve seats are expensive to repair. When the last mentioned type of conveyor needs valve repair, the affected section of the conveyor must be disassembled before the elements of the valve can be reached, thus placing the entire conveyor out of commission while the repairs are being made.

A great number of valves are used in a conveyor system, therefore, it will be appreciated that the cost of the individual valve and the cost of preparing the airfilm table to receive each valve, materially affects the initial cost of the conveyor. It also will be appreciated that the greater the number of parts in the valve, the more susceptible it is to breakdown. Thus, the time and expense which must be expended in removing and repairing the valves, govern the cost of maintaining the conveyor.

Accordingly, an object of this invention is to provide a pneumatic conveyor which overcomes the foregoing difficulties and disadvantages, has a low initial cost and is inexpensive to maintain.

Another object is to provide such a conveyor including an airfilm table having valves which comprise a minimum number of parts, are easily installed and removed, are economical to manufacture, and form an effective seal to prevent loss of air at the portion of the conveyor not in use.

A further object is to provide such a conveyor wherein the airfilm table can be fabricated inexpensively to receive such valves.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing in a pneumatic conveyor, an airfilm table having a valve seat provided therein, a manifold below the table including a bottom wall, the valve seat having an annular portion extending downwardly toward the wall, and a freely moveable valve member positioned within the annular portion and having a spherical portion adapted to abut the seat, the manifold wall and the valve member being constructed and arranged so that the valve member is confined by the annular portions and the wall.

A preferred embodiment of the invention has been chosen for purposes of illustration and description, and is shown in the accompanying drawings, forming a part of the specification, wherein.

Figure 1:
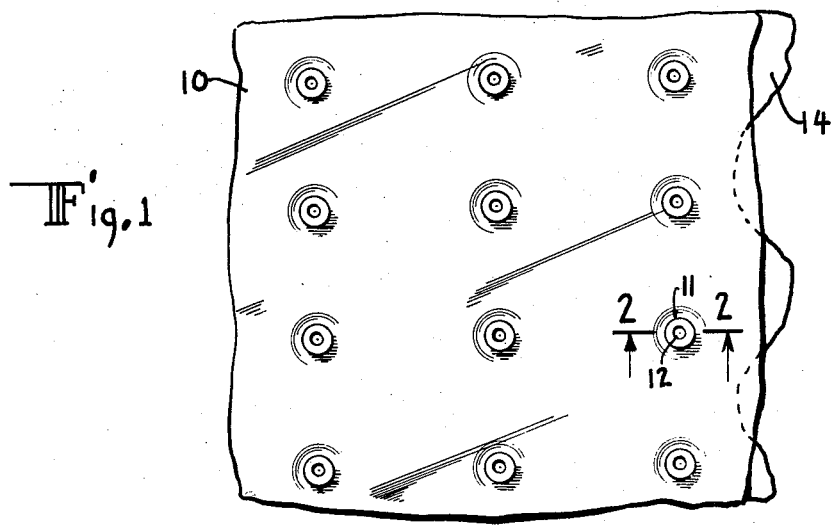
Fig. 1 is a fragmentary plan view of an airfilm table of a pneumatic conveyor in accordance with the present invention.

Referring to the drawings in detail, there is shown a pneumatic conveyor in accordance with the present invention which generally comprises an airfilm table 10, valve seats 11, ball valve members 12, and a compressed air supply manifold including a bottom wall 14.

Figure 2:
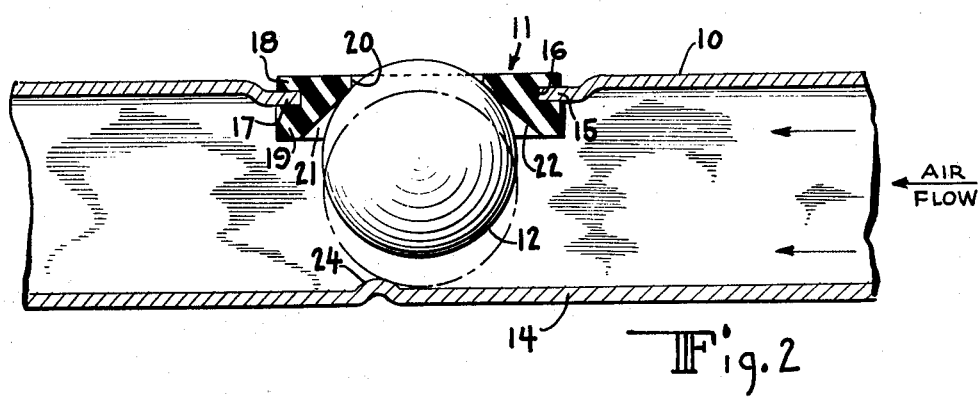
Fig. 2 is an enlarged sectional view taken along the line 2—2 on Fig. 1 illustrating the construction of the table and one of the valves.

As shown in Fig. 2, the airfilm table 10 is constructed of sheet metal and is formed with rows of circular depressed portions providing recesses 15 having a central opening 16 for receiving the valve seats 11.

The valve seats are ring-like members formed of rubber or the like which have an outer annular recess 17 for receiving the portions of the table defining the openings. The seat members 11 also have an upper annular portion 18 above the recess 17 and a lower annular portion 19 below the recess 17, and are provided with a central passage including an upper opening 20 and a lower opening 21 connected by a conical wall 22 adapted to be engaged by the balls 12. The upper portion 18 has a thickness equal to the depth of the recess 15, and the lower portion 19 extends downwardly to confine the ball valve member 12 against substantial horizontal movement.

The ball valve member 12 and the central passage are dimensioned such that the ball, when in its raised position, contacts the wall 22 at a point adjacent the opening 20, thereby allowing the ball to travel vertically. The manifold wall 14 is positioned parallel to the air table 10 and is spaced from the bottom of the lower seat portion 19 a distance less than the diameter of the ball valve member 12, thereby preventing the ball from dropping below the portion 19 and escaping its confinement within the valve seat member.

The flow of compressed air through the manifold is in the direction indicated by the arrow (Fig. 2) and in order to insure proper seating of the ball, a protrusion 24 is provided in the manifold wall 14 spaced from the center of the seat, for example downstream thereof. When the ball is unseated, the air flow tends to push the same against the wall 22 and cause it to revolve and move in a circular path within the seat. The protrusion 24 arrests this circular motion allowing the ball to be lifted into its seated position.

Figure 3:
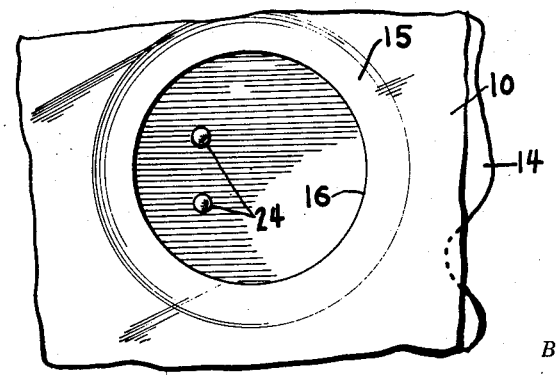
Fig. 3 is an enlarged fragmentary plan view of the table with the valve elements removed illustrating a modification of the construction shown in Fig. 2.

In Fig. 3, a modified construction is shown wherein two protrusions 24 are provided to obtain a more positive retention of the ball 12 against displacement by air flow. While these protrusions are shown as being located downstream of the centerline of the seat, it will be appreciated that they may be placed upstream of the centerline or in any other position having a comparable offset from the centerline.

In operation, with the balls 12 in the lower broken line position (Fig. 2), compressed air is admitted into the manifold. As the air flows between the conical walls 22 and the upper surface of the balls 12, and out through the openings 20, its pressure decreases allowing the air pressure acting on the lower ball surfaces to lift the balls and seat them against the wall 22, as shown by the full line position in Fig. 2. The air pressure holds the valve members in closed position until the leading edge of an article in being moved along the table 10 moves onto the upper portions 18 of the valve seats and engages the uppermost portion of the balls 12 protruding through the openings 20, thereby depressing the balls and allowing a film of air to be introduced under the article to support the same on the conveyor table.

The airfilm table 10 by being constructed of sheet metal, enables the recesses 15 and the openings 16 to be inexpensively formed in one operation, thus reducing the cost of manufacture.

Since the valve seats 11 are made of rubber or similar material, they will form an effective seal with the balls and may be easily removed by gripping the upper portion 18 thereof and pulling the lower portion 19 through the opening 16. The balls may then be lifted out by use of a magnet or a suction cup, or may be blown out by turning on the air.

From the foregoing description, it will be seen that the present invention provides a pneumatic conveyor which is simple in construction, has a low initial cost and is inexpensive to maintain. It will further be seen that this is accomplished by providing airfilm table valves having only two parts which are easy to install and remove, and an airfilm table which is inexpensively prepared to receive such valves.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a pneumatic conveyor, an airfilm table having a valve seat provided therein, a manifold below said table including a bottom wall, said valve seat having an annular portion extending downwardly toward said wall, and a freely movable valve member positioned within said annular portion and having a spherical portion adapted to abut said seat, said manifold wall and said valve member being constructed and arranged so that said valve member is confined by said annular portion and said wall.

2. In a pneumatic conveyor, an airfilm table having a hole therein, a manifold below said table including a bottom wall, a valve seat member positioned in said hole and having an annular portion extending downwardly toward said wall, a freely moveable valve member positioned within said annular portion and having a spherical portion adapted to abut said seat member, said manifold wall being positioned below said annular portion a distance less than the vertical dimension of said valve member, whereby said valve member is confined by said annular portion and said wall.

3. In a pneumatic conveyor, a thin airfilm table having a downwardly deformed portion providing a recess having an opening therein, a manifold below said table including a bottom wall, a resilient valve seat member positioned in said opening having an upper annular portion substantially filling said recess and having a lower annular portion extending downwardly toward said wall to provide a passageway extending therethrough formed with a seat, a freely moveable valve member positioned within said lower annular portion and having a spherical portion adapted to abut said seat, said manifold wall being positioned below said lower annular portion a distance less than the vertical dimension of said valve member, whereby said valve member is confined against substantial horizontal movement by said lower annular portion.

4. In a pneumatic conveyor according to claim 3, wherein said valve seat is conical.

5. In a pneumatic conveyor according to claim 3, wherein said valve seat member is provided with an outer annular recess between said upper annular portion and said lower annular portion for receiving the portion of said table defining said hole.

6. In a pneumatic conveyor according to claim 3 wherein said wall is provided with upwardly extending means beneath said passageway and spaced from the middle thereof.

References Cited in the file of this patent

UNITED STATES PATENTS

| | | |
|---|---|---|
| 343,451 | Habernicht | June 8, 1886 |
| 571,833 | Hunter | Nov. 24, 1896 |
| 629,140 | Vollkommer | July 18, 1899 |
| 806,331 | Ferry | Dec. 5, 1905 |
| 2,112,336 | Duvall | Mar. 29, 1938 |
| 2,176,307 | Lamb | Oct. 17, 1939 |
| 2,315,627 | Lamb | Apr. 6, 1943 |
| 2,651,549 | Ross | Sept. 8, 1953 |